May 22, 1973     K. N. MATSUMURA     3,734,851

METHOD AND DEVICE FOR PURIFYING BLOOD

INVENTOR.
KENNETH N. MATSUMURA

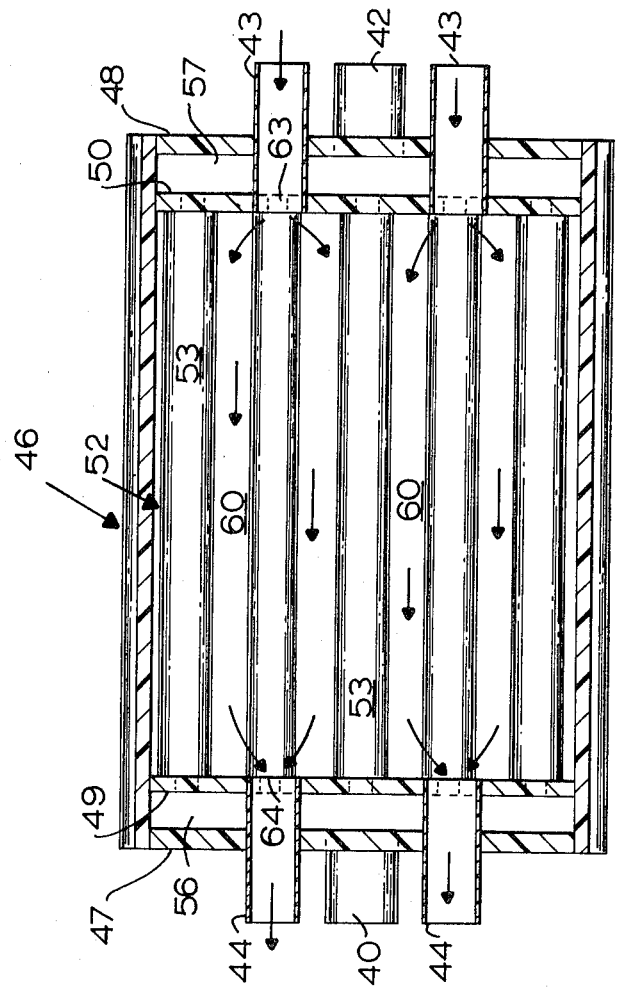

United States Patent Office 3,734,851
Patented May 22, 1973

3,734,851
METHOD AND DEVICE FOR PURIFYING BLOOD
Kenneth N. Matsumura, 2 Claremont Crescent,
Berkeley, Calif.
Filed Dec. 29, 1969, Ser. No. 888,733
Int. Cl. B01d 31/00, 13/00
U.S. Cl. 210—22
18 Claims

ABSTRACT OF THE DISCLOSURE

A method for hepatifying, or purifying animal blood of living animal and providing it with desirable liver cell metabolic products, in cooperation with or substitution for the animal liver; and a device for carrying out such hepatification or purification and provision of desirable products. The method comprises flowing animal blood over a first semi-permeable membrane, flowing a dialysate liquid over a second semi-permeable membrane, maintaining a layer of living liver cells between the two membranes and out of contact with the blood and the liquid, and withdrawing impurities from the blood into the dialysate liquid, and restoring liver cell products to the blood. The device comprises at least one hepatification unit having a first semi-permeable membrane, a second semi-permeable membrane, a layer of living liver cells disposed between such membranes, means for introducing blood over a surface of one membrane, means for introducing dialysate liquid over a surface of the other membrane, and means to maintain the blood, liquid and liver cells out of contact with each other.

BRIEF SUMMARY OF THE INVENTION

This invention relates to a method for "hepatifying" an animal body fluid such as blood or peritoneal fluid; and it particularly concerns extracorporeal hepatification of blood. The invention also relates to a device or article for carrying out such treatment. The terms "hepatifying," "hepatification" and "hepatify," where used in this specification and claims mean the procedure of changing the constitution of blood or other body fluid as the liver effects such change normally in the blood or other body fluid passing therethrough in a live animal.

The value of an artificial liver to substitute or supplement a diseased liver, e.g., cirrhotic, toxin-damaged, infected or other, of human patients has been recognized for years. Well over 28,000 Americans die annually from cirrhosis of liver alone, and there are six to eight million Americans living with failing, cirrhotic livers. But unlike the kidney, the function of which basically is only to filter; or unlike the heart, the function of which is purely mechanical, the liver has functions which are not only complex but which involve the removal, chemical conversion, or addition into the blood of a multitude of chemicals, or combinations of these functions. In other words, liver has functions which only something equally as complex as liver cells can accomplish. Therefore, there realistically has seemed to be little chance of developing an artificial liver. However, I have succeeded in developing a method and device for effecting such functions, which make use of living liver cells incorporated in a housing of suitable synthetic materials.

It is an object of this invention to provide a method for hepatifying blood or a body fluid. It is a further object to provide a device to enable carrying out such a method. Other objects and advantages will become apparent as the description proceeds.

In the method of this invention, which will be described particularly with respect to the treatment of blood, a stream of blood from a living animal is flowed over a first semi-permeable membrane, a layer of living cells is maintained adjacent such membrane out of contact with the blood, a second semi-permeable membrane is maintained adjacent such layer of cells and out of contact with at least a major portion of the first membrane, and dialysate liquid is flowed over the second membrane out of contact with the blood and the cells. In this manner, waste products carried by the blood pass through the first membrane, are acted upon by the cell layer, pass out through the second membrane, and are taken up by the dialysate liquid and carried away. At the same time, desirable metabolic products generated by the living liver cells and substances in blood received and acted upon by these cells to form desirable products, are taken up into the blood stream. Likewise, any desired salt or substances such as amino acids and vitamins in the dialysate liquid pass through the device to enter the blood stream wherein the concentration of such component has been depleted.

In accordance with this invention, the blood as described is passed in contact with a surface of a semi-permeable membrane which is adjacent to and partitions off a "mono"-layer of mixed population liver cells and this layer is in turn adjacent to and partitioned off by another semi-permeable membrane, of the same or different characteristics, which is in contact with dialysate liquid. The first membrane, which is in contact with the blood, is of such type as to allow passage of molecules, or be permeable thereto, but most preferably in an advantageous embodiment is not permeable to cells, or will not allow passage thereof. It prevents entry into the liver cell layer of immunological cells in blood which would otherwise destroy the liver cells when genetic histo-incompatibility exists between the liver cells and the animal being treated, and it is also prevents the loss of liver cells into the blood. Suitably, such first membrane allows optimum passage of molecules of great divergency in size, shape and electrical charge, such as protein, carbohydrate, bilirubin, ammonia, etc. Such membrane can be, for example, of Millipore Filter MF (made of mixed esters of cellulose) HAW, having a porosity or average pore size of about 0.45 micron, which is well-known and has a high flow rate and well-defined porosity. Other membranes useful herein include Millipore Polyvic (of polyvinyl chloride), Solvinert (a solvent resistant membrane, sold by Millipore Corp.) and a cellulose acetate membrane made and sold under the trademark Celotate by Millipore Corp., Bedford, Mass. Each membrane of different chemistry and structure has its characteristic properties regarding preferential passage of certain molecules, permitted flow rate, toxicity, and ease of handling, strength, durability in use, clot-forming property, etc., as is well-known in this art, and is selected accordingly by one skilled in the art. Where it is preferable or possible to dispense with the protein metabolism function of hepatification, there can be used as the first membrane one which does not allow passage of large molecules such as proteins. In such instance, there can be used, for example, cellulose membrane of the type used in the Kolff artificial kidney (described in J.A.M.A. 161 (15):1433 (1956) Kolff, W., which has a thickness of about 1/1000 inch, or other suitable materials such as cellophane. The membrane will be of such thickness as to allow ready or rapid exchange of molecules, or passage thereof, while preventing the destruction of liver cells by immunological mechanism. The Millipore Filter MF HAW, for instance, having a thickness of 150 microns, is advantageous for use herein. However, other membranes of different thickness, e.g., as low as 30 microns, can be used, so long as they exhibit suitable permeability and adequate strength for installation in the arrangement employed. The first membrane is advantageously treated to decrease or prevent clot formation on the blood-contacting surface thereof, e.g., by siliconizing, heparin binding and the like, in the manner well-known to the art. Heparin binding is described, for instance, by R. E. Leininger et al. in (1965) Sixth Internat. Conf. on Med. Electron. & Biol. Engineer; and in Science 152:1625.

The second membrane, in contact with the dialysate liquid, is of such type as to allow passage of molecules of less size than protein molecules. It prevents the loss of liver cells into the dialysate fluid and prevents massive protein loss from blood into the dialysate. During the hepatification procedure, the blood being treated exchanges molecules therein, such as unconjugated bilirubin, ammonia, glucose, proteins, amino acids, vitamins, etc., with molecular products of the liver cells of the liver cell layer, such as albumin, alpha-globulins, beta-globulins, clotting factors, vitamins, etc., at the first membrane surface. At the same time, such liver cell products as conjugated bilirubin, bile salts, urea, etc., pass out into the dialysate fluid through the second membrane. The second membrane is adapted to prevent passage of cells and large molecules, such as proteins, and to allow passage, or be permeable to, smaller-than-protein molecules, and those of different shape and electrical charge, such as the conjugated bilirubin, etc., mentioned above. One very advantageous membrane for use as the second membrane is the cellulose membrane as used in the Kolff artificial kidney and which has a thickness of $\frac{1}{1000}$ inch (25.4 microns). Other membranes can be employed as second membrane so long as they exhibit the desired predetermined permeability and adequate strength; and thicknesses of from about 25 to about 75 microns have been useful herein. As suitable membranes may be mentioned those of Silastic (of silicone rubber, made and sold by Dow Chemical Company, collodion, cellophane, and the like.) The membrane is selected by those skilled in the art to exhibit its known preferential passage of the molecules, proper lack of toxicity, its strength, ease of handling and durability in use, for instance.

Permeability of the above-described membranes, as is known, does not depend on a single physical property such as thickness or porosity, but is characteristic affected by such physical property or by a chemical property such as limited mutual solubility with the material to be passed therethrough, or by both such properties. Therefore, the membranes are selected according to known or predetermined permeability to the components in question. However, where porosity is a determining factor, pores of not over 0.45 micron are selected to prevent passage of cells, whereas proteins and the molecules described herein will pass through pores of not over 0.45 micron.

The dialysate liquid will vary in its composition, depending upon the animal being treated and its particular needs. One such aqueous dialysate fluid which is available in commerce, and to which other components such as vitamins, amino acids, etc., can be added when required, contains, typically: 134 m.eq. $Na^+$, 2.6 m.eq. $K^+$, 2.5 m.eq. $Ca^{++}$, 1.5 m.eq. $Mg.^{++}$, 104 m.eq. $Cl^-$, 36.6 m.eq. acetate and 2.05 gm./liter dextrose (anhydrous).

The liver cell layer can be prepared, if desired, by preparing an "instant" confluent or superconfluent "mono"-layer, using tissue culture techniques well known to those skilled in the art, on either membrane prior to their assembly into the trilaminate structure described and shown herein, from a fresh aqueous suspension of mixed population liver cells. Such suspension can be made, for example, by the method described by A. Moscona in Development of Cell Systems and Their Control, pp. 45–70, D. Rudnick, Editor, N.Y., The Ronald Press, 1960; and J. Cell Comp. Physiol., 1962, 60 (Supp.):65–80; and Int. Rev. Path. 1962, 1:371–428; and by J. Trinkaus, 1961, in La Culture Organotypique, Assoications et Dissocations d'Organes en Culture in Vitro, pp. 209–226, Paris, Colloq. Intern. Centre Natl. Recherche Sci. The liver cell layer can alternatively be made by the well-known mechanical dispersion method, using a stainless steel sieve. By the term "instant" is meant that a membrane is treated with or placed in contact with a suspension of the living cells at a high concentration, and a "mono"-layer is then formed by cell attachment to the membrane, producing a confluent or superconfluent, "mono"-layer immediately. A confluent "mono"-layer is a layer completely covering the membrane to a depth of one cell, but it will be understood that a minor portion of the surface of the membrane can be covered with a layer of more than one cell in depth; and in a superconfluent "mono"-layer, such covering is two or more cells in depth. These terms and procedures are well known in the art. If a confluent layer is produced in the usual fashion, starting with a suspension of $2.5.10^5$ cells per cc., of mixed population liver cells, there occurs an undesirable change in the ratio of epithelial cells:fibroblast cells in the monolayer, from that found in vivo. Fibroblast cells selectively proliferate faster than epithelial cells. It is particularly advantageous, therefore, to employ a confluent or superconfluent "mono"-layer for two reasons: First, to allow for maximum hepatification per surface area, and second, to discourage proliferation of fibroblasts as well as de-differentiation of epithelial cells. The depth of the liver cell layer is advantageously from about 15 to about 20 microns, for optimum exchange with both the blood and the dialysate, as well as for discouraging de-differentiation. However, it is not essential to employ a "mono"-layer, so long as the cell layer permits flow between the membranes as described herein. One alternative to the "mono"-layer is to employ a slice of liver tissue of live cell structure, preferably of from 20 to 100 microns in thickness, and of area to cover the membrane as completely as possible.

The device of the present invention comprises at least one hepatification unit having a first semi-permeable membrane, a second semi-permeable membrane, means to introduce a body fluid into contact with the first membrane, means to introduce a dialysate liquid into contact with the second membrane, a layer of living liver cells disposed between such membranes, means to maintain the body fluid and the liquid and the liver cells out of contact with each other, and means to withdraw the body fluid and the liquid separately from contact with such membranes. Advantageously, the device includes a plurality of such hepatification units assembled in one jacket or housing. The semi-permeable membranes can be of the same material, or, in one advantageous embodiment, are of dissimilar materials and permeable to different components of the liquids or suspensions.

Although the method and device are described herein as applied in an artificial liver arrangement, the invention is also useful as an artificial liver-kidney for use when both liver and kidney failure simultaneously, as they often do; or as an artificial endocrine pancreas-kidney for use in cases of diabetic electrolyte imbalance and in such instance, the cellular layer of the trilaminate structure is comprised of pancreatic islet cells isolated by using the technique described by S. Moskalewski, in Gen. Comp. Endoc. 5: 342 (1965), or C. Hellerstrom (1964) Acta Endocrinol. 45: 122–132; or made up of insulinoma cells from a patient. A mono-layer of insulinoma cells can be formed from lower cell concentrations, e.g. of $5.10^5$ cells/cc., by conventional methods.

The device of this invention including the layer of living cells can be preserved substantially indefinitely by first perfusing both blood and dialysate liquid chambers with glycerol in 15% solution in TC–199 culture medium (Proceeding of Society of Experimental Biology and Medicine, volume 73, page 1, 1950, developed by Morgan and sold by many drug companies), then slowly reducing the temperature to that of liquid nitrogen, over a period of about 30 hours, and storing at that temperature. In the absence of such freezing, the unit can be preserved for some days by keeping both blood and dialysate chambers filled with TC–199 medium which has been suitably oxygenated and at a pH of about 7.2 (phenol red indicator indicates neutral) and held at 4° C. When in use and in exchange relationship with flowing blood, the life span of the cell layer is substantially unlimited. Prior to use they should be thawed out rapidly in a 37° bath.

BRIEF DESCRIPTION OF THE DRAWINGS

The invention will be illustrated and explained by the written description and by the annexed drawings which show some embodiments of the device of this invention and wherein

FIG. 7 is a vertical sectional view taken on line 7—7 of FIG. 5 and showing typical flow of dialysate liquid therethrough.

DETAILED DESCRIPTION OF THE INVENTION

Figure 1:
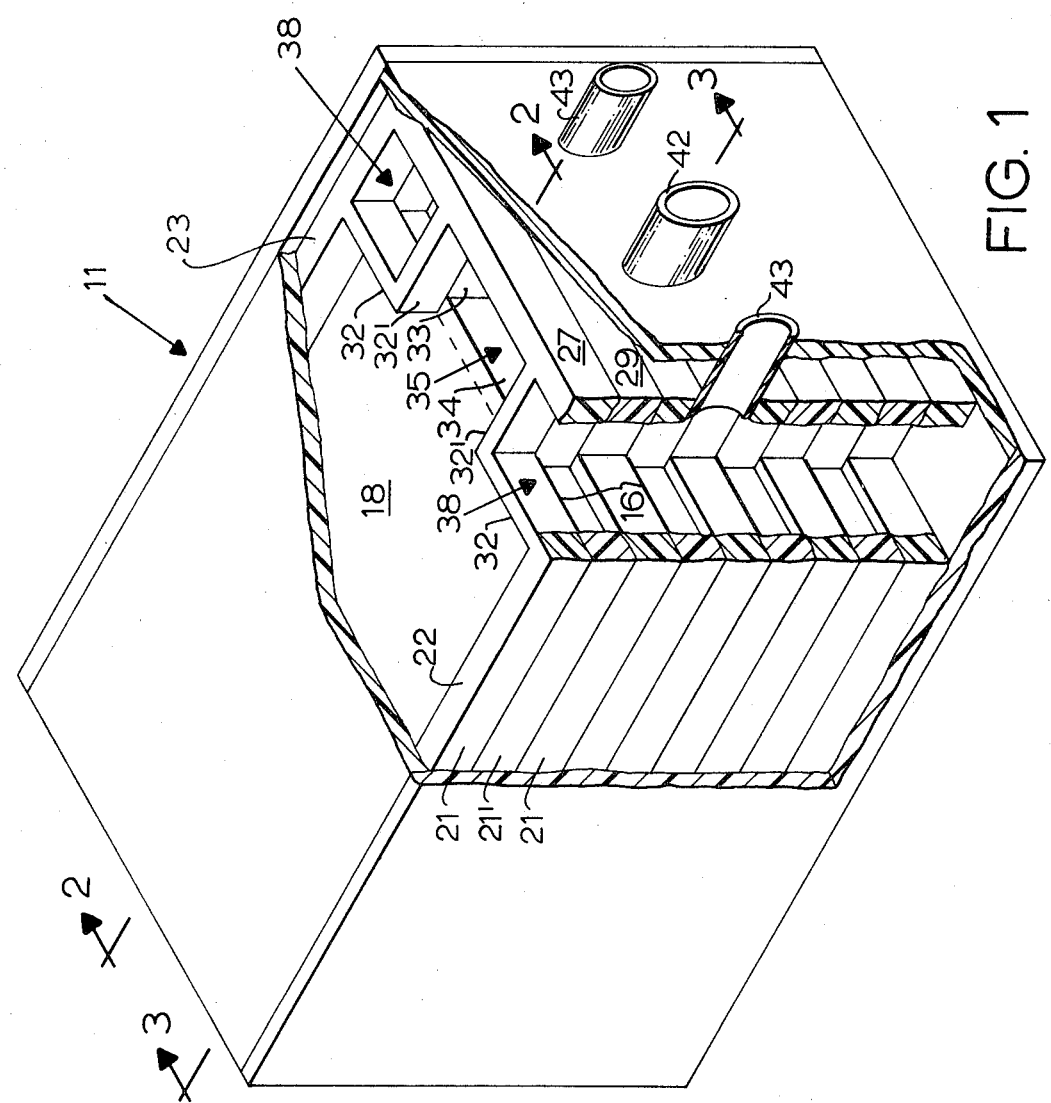
FIG. 1 is a perspective view, partially cut away, of one embodiment of a device or apparatus according to the invention.

The method of this invention can be carried out in any suitable apparatus. Some suitable embodiments are shown in the drawings and some modes of carrying out the method of the invention will be described with respect thereto.

Figure 2:
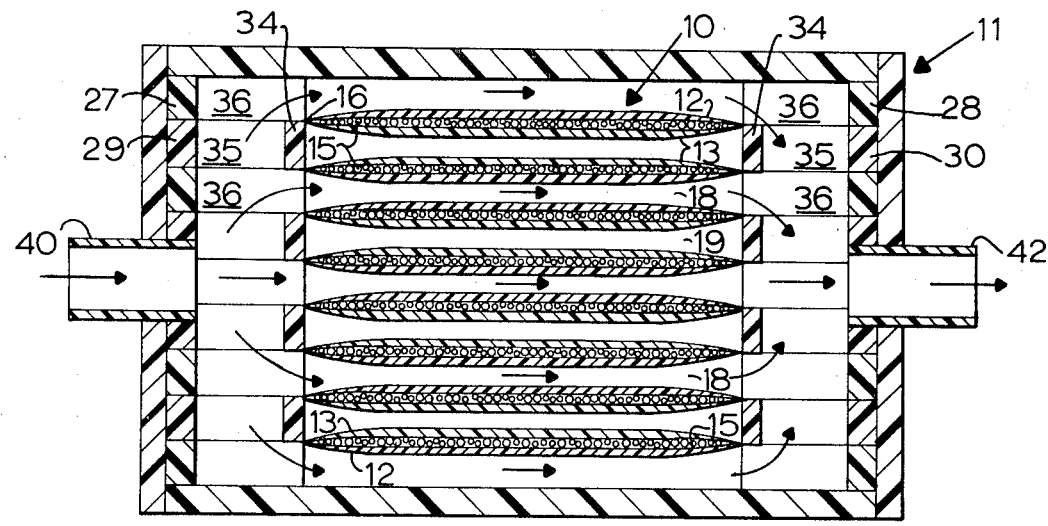
FIG. 2 is a vertical sectional view taken on line 2—2 of FIG. 1 and showing typical flow of blood in this embodiment.
Figure 3:
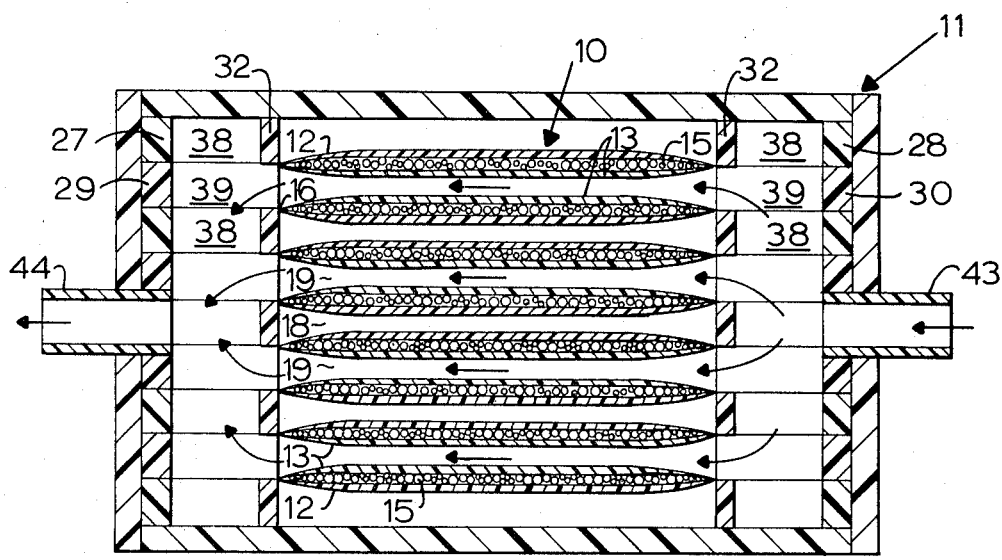
FIG. 3 is a vertical sectional view taken on line 3—3 of FIG. 1 and showing typical flow of dialysate liquid in that embodiment.
Figure 4:
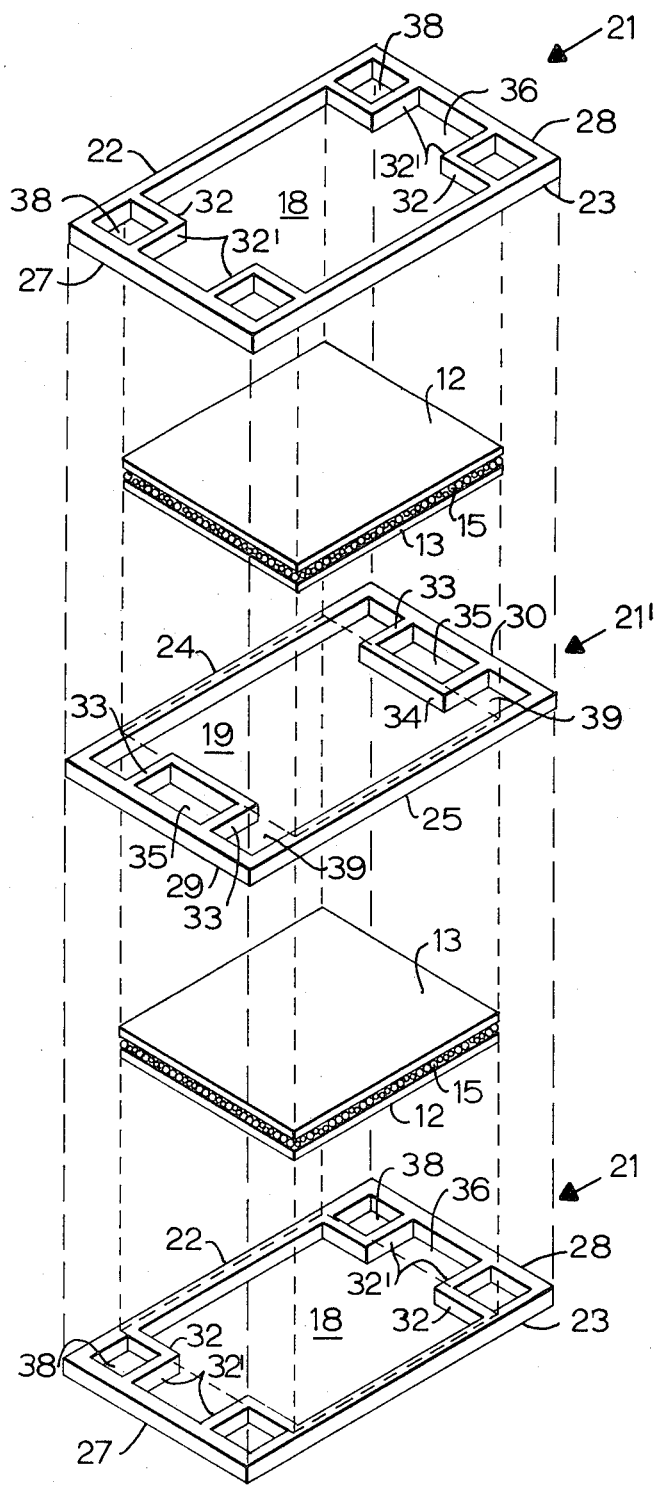
FIG. 4 is an exploded view of one embodiment of a hepatifying unit.

There is shown in FIGS. 1–4 an assembly of hepatifying units 10, within a housing 11. Each unit 10 comprises a first semi-permeable membrane 12 adapted to be in contact with the blood when introduced into the device, and a second semi-permeable membrane 13 adapted to lie in contact with dialysate liquid when the latter flows through the device. Between membranes 12 and 13 is disposed a mono-layer 15 of mixed population liver cells deposited from a highly concentrated suspension thereof as disclosed above. Membranes 12 and 13 are sealed together at the ends and sides, as illustrated at 16, suitably by means of silastic glue, to enclose the liver cells layer 15. In this embodiment, membrane 12 is of Millipore Filter MF HAW of 150 microns thickness. Membrane 13 is of cellulose about 1/1000 inch (25.4 microns) in thickness, and liver cells layer 15 is from 15 to 20 microns thick. As shown in FIGS. 2 and 3, in this embodiment, units 10 lie in alternately reversed positions with respect to the first and second membranes, i.e. in adjacent units like membranes are adjacent or face each other, whereby a path 18 is formed, e.g. of a pair of like membranes, for the passage of blood; and a path 19, of a pair of like membranes 13, for passage of dialysate liquid.

Flow of the fluids through such passages is restricted also and directed by frames 21, 21' which provide the side walls 22, 23, 24 and 25 of such passages; and the end walls 27, 28, 29 and 30 thereof. Extending inwardly from side walls 22 and 23, adjacent their juncture are dividing walls 32'; and extending inwardly from end walls 29 and 30 in frame 21' are dividing walls 33 extending generally perpendicularly to walls 29 and 30, and walls 34, generally parallel to walls 29 and 30, to form an enclosed area 35. Area or aperture 35 adjoins with space 36 in frame 21, when assembled, to form an entrance or exit passageway or reservoir for blood, conducting it to passage 18. Similarly, apertures 38 framed by walls 32, 32' in frame 21, mate with areas or apertures 39 in frame 21', when assembled, to form a conduit or passageway or reservoir to conduit dialysate liquid to passages 19, at one end of the device and to withdraw it at the other end, similarly to the above arrangement for conducting blood to and from the hepatifying units. A suitable inlet conduit 40 and outlet conduit 42, are provided to enable introduction and withdrawal of the body fluid such as blood; and conduits 43 and 44, respectively, enable introduction and withdrawal of the dialysate liquid, to flow countercurrent to the flow of blood. Flow can be effected concurrently, but it is advantageous to carry it out countercurrently. Frames 21 in this embodiment are made of Silastic, but they can be made of lucite or other material compatible with body fluids and are preferably treated to prevent clotting effect on blood, as described above with respect to the other membranes. The housing is preferably made of silastic, or at least the interior surfaces which come in contact with blood or body fluid are of silastic. However, any other desired material compatible with blood or body fluid can be employed.

In carrying out the method of this invention, using the above-described device, blood can be pumped from an animal (e.g. from radial artery) by a suitable pump, can be warmed to 37° C. by passing through a heat exchanger (not shown) a suitable device being described by Darin, J. in J.A.M.A. 201 (12): 19, 1967) and pumped e.g. such as used in the Kolff artificial kidney arrangement (e.g. Signamotor, Sigmamotor, Inc., Middleport, N.Y.), being conducted through inlet 40 to enter a space 36, flowing into passage 18 and upwardly and downwardly through adjoining spaces 35, 36, all sealed together to form a closed passageway, to enter the remaining passages 18, flowing across these in contact with membranes 12 and out through adjoining spaces, 35, 36 at the exit end, thence through outlet conduit 42 and through a filter of known type (not shown) to remove any clots, and is then returned to the animal bloodstream. Such pump can be disposed either upstream or downstream of the hepatifying device. In like manner, but in reverse direction of flow, dialysate liquid after having been warmed to 37° and bubbled through it a stream of gas comprising 90% oxygen and 10% $CO_2$ enters through conduits 43, flows into passage 19 and upwardly and downwardly through adjoining spaces 38, 39, likewise sealed together to form a closed passage and thence into the remaining passages 19, through passages 19 in contact with membranes 13, and is collected in adjoining passages 38, 39 at the exit end for such liquid, and flows outwardly through conduits 44.

Figure 6:
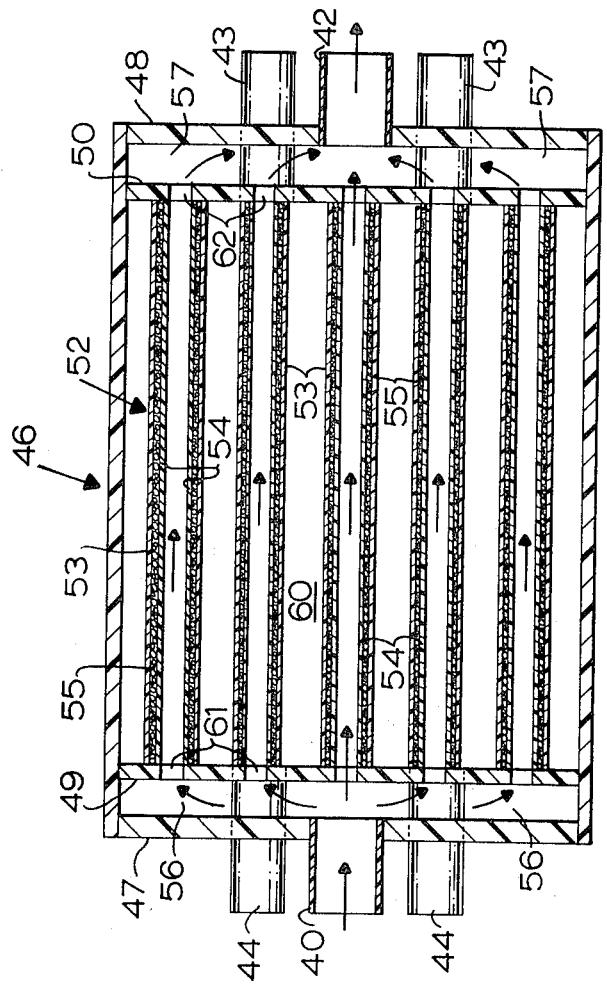
FIG. 6 is a vertical sectional view taken on line 6—6 of FIG. 5 and showing typical flow of blood therethrough.

In FIGS. 6, 7 and 8 are shown views of another embodiment of the device of this invention including a tubular housing 46 having end walls 47, 48 and circular partition walls 49, 50, adjacent end walls 47 and 48, respectively. Extending from partition wall 50 to partition wall 51 and supported at their ends at suitable apertures 61, 62, are a plurality of tubular hepatifying, trilaminate unit 52. Each unit 52 comprises an outer membrane 53 adapted to be in contact with dialysate liquid and an inner membrane 54 adapted to be in contact with blood or body fluid to be purified, corrected or re-constituted, and, disposed between these membranes a layer 55 of living liver cells of mixed population. The membranes can, if desired, be reversed as to such position but it is advantageous to flow the relatively small amount of blood from an animal through the small hepatifying units and to flow a larger amount of dialysate liquid through the space surrounding such units. An inlet conduit 40 brings the blood into a chamber 56 between walls 47 and 49 and thence through apertures 61 in wall 49 into and through the interior of each unit 52 where it passes in contact with membrane 54. The blood so treated then flows out through apertures 62 in wall 50 and is collected in manifold 57 between walls 50 and 48, thence flowing out through exit pipe 42. Pumping, heating and filtration are as discussed above with respect to FIGS. 1–4. Dialysate liquid enters through inlet pipes 43 and flows through suitable apertures 63 into the interior space 60 between the shell 59 and walls 49 and 50 to surround units 52; and thence flows out through apertures 64 in wall 49 and out through exit conduits 44. In one mode of making tubular units 52, the cells are applied to membrane 53, e.g. of cellophane, to form the desired layer of cells, and the cellophane with attached cells is wrapped around a Millipore tube 55, and then the ends of the cellophane wrap are sealed together with Silastic adhesive or glue. Any other desired method of making the unit can be employed, as, for instance, allowing the cell layer to attach first to a Millipore tube, then dip-coating the tube and layer into a Silastic suspension.

EXAMPLE 1

This example was carried out in a device as shown in FIGS. 1 through 4, and wherein cell layer 15 was a confluent mono-layer of rat liver cells and the animal treated was a rat with experimentally induced hepatic failure (effected by repeated carbon tetrachloride exposure) which was placed under light anesthesia on a restraining board.

To prime the device there were used 8 cc. of blood, i.e. to equal the volume of the blood chamber within the device. The total exchange surface area, in contact with the blood, was $1.47.10^2$ sq. cm., and blood flow rate was maintained at 1.33 cc./min. during the run. The dialysate flow rate was at least 20 ml/min. of fresh dialysate solution, of the composition described above. Input blood pressure was 15 mm. Hg.

The results obtained upon four hours' hepatification treatment as described were as set out in Table I.

TABLE I

| Substance | Pre-hepatification serum values | After 4 hrs. |
|---|---|---|
| Bilirubin | 13.3 mg./100 ml. blood | 6.3 mg./100 ml. blood. |
| Albumin | 3.50 mg./100 ml. blood | 3.70 mg./100 ml. blood. |
| $NH_3$ | 200 µg./100 ml. blood | 100 µg./100 ml. blood. |
| Bromosulfophthalein. | 60% retention after 45 min. | 5% retention, with hepatification unit in operation. |

EXAMPLE 2

Figure 5:
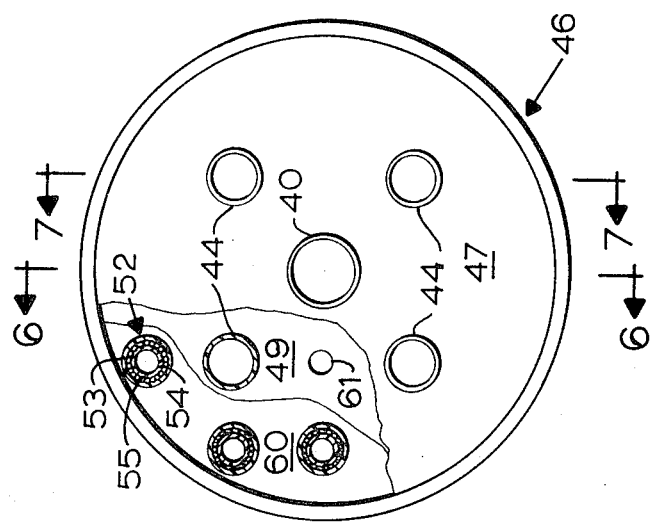
FIG. 5 is an end view, partially cut away, of another embodiment of the device of this invention.

This example was run on a device as shown in FIGS. 5 through 7 and the test conditions were the same as in Example 1, except that the priming volume was 8.16 cc. and the total exchange area was $1.13.10^2$ sq. cm. Also in the test rat of this example, the pre-hepatification serum values were as given in Table II, and the results shown therein were obtained:

TABLE II

| Substance | Pre-hepatification serum values | After 4 hrs. |
|---|---|---|
| Bilirubin | 15.0 mg./100 ml. blood | 5.5 mg./100 ml. blood. |
| Albumin | 3.55 mg./100 ml. blood | 3.70 mg./100 ml. blood. |
| $NH_3$ | 179 µg./100 ml. blood | 95 µg./100 ml. blood. |
| Bromosulfophthalein. | 45% retention after 45 min. | Trace. |

It can be seen from the above examples that ammonia and bilirubin are satisfactorily reduced in the blood, while albumin is increased, as is also desirable, and B.S.P. (bromosulfophthalein) is substantially removed, the latter being a dye injected to determine liver functioning.

It will be understood that the drawings and specific description have been given for purposes of illustration only and that variations and modifications can be made therein without departing from the spirit and scope of the appended claims. In the method of this invention, contact time between the blood and the membrane can be varied by changing the area of contact or by varying rate of flow of the blood, or both. The exchange device can alternatively be constructed according to the design of the Skeggs-Leonard artificial kidney or the Kiil artificial kidney or in any other desired manner wtich provides, especially, maximum surface area of contact between the blood and trilaminate structure, and embodying the features of this invention. The device can be for extra-corporeal or for intracorporeal use, employing suitable compatible materials of construction. The method can be operated with simultaneous liver cell treatment and dialysis of the blood; or in series by first effecting the exchange with the liver cells, followed by exchange with the dialysate liquid.

Having now described the invention, I claim:

1. Method of hepatifying a body fluid of a living animal comprising
    (a) maintaining a flow of said fluid over a semi-permeable membrane,
    (b) maintaining a layer of living liver cells in contact with said membrane and out of contact with said fluid to provide metabolic liver products to said fluid through said membrane,
    (c) maintaining a flow of dialysate liquid,
    (d) maintaining a second semi-permeable membrane between said fluid and said liquid, and withdrawing impurities and metabolic breakdown products from said fluid through said second membrane into said dialysate liquid.

2. In a method of hepatifying an animal body fluid, the steps comprising
    (a) flowing a stream of said fluid over a first semi-permeable membrane permeable to molecules smaller in size than animal cells,
    (b) maintaining a layer of living liver cells, adapted to generate metabolic products, adjacent said first membrane and out of contact with said fluid,
    (c) flowing a stream of dialysate liquid over a surface of a second semi-permeable membrane permeable to molecules smaller in size than proteins and animal cells,
    (d) maintaining said second membrane adjacent said layer of cells out of contact with a major portion of said first membrane,
    (e) maintaining said dialysate liquid out of contact with said fluid and said cells,
    (f) effecting withdrawal of impurities from said stream of fluid through said layer of cells and into said stream of dialysate-liquid to purify said fluid, and
    (g) withdrawing into said fluid metabolic products generated by said living cells to re-constitute said fluid.

3. Method as in claim 2 wherein said body fluid is blood.

4. Method as in claim 2 wherein said layer comprises mixed population liver cells.

5. Method as in claim 2 wherein said layer is from about 15 to about 20 microns in thickness.

6. Method as in claim 2 wherein said layer is a confluent mono-layer of said cells.

7. Method as in claim 2 wherein said layer is a superconfluent mono-layer of said cells.

8. A device for hepatifying body fluids comprising in combination
    (a) a first semi-permeable membrane permeable to molecules smaller than animal cells,
    (b) a second semi-permeable membrane permeable to molecules smaller than protein molecules and animal cells,
    (c) said membranes being out of contact with each other over at least a major portion of their surface areas and being disposed so as to enclose a space for reception of animal liver cells, and
    (d) a layer of living liver cells disposed in said space and in contact with each of said membranes.

9. Device as in claim 8 wherein said first membrane is of mixed cellulose esters, has an average pore size of about 0.45 micron diameter and is about 150 microns thick.

10. Device as in claim 8 wherein said second membrane is of cellulose and has a thickness of about 25.4 microns.

11. Device as in claim 8 wherein said cell layer consists essentially of mixed population liver cells.

12. Device as in claim 8 wherein said first membrane has a thickness of from 30 to 150 microns.

13. Device as in claim 8 wherein said second membrane has a thickness of from 25 to 75 microns.

14. An assembly for hepatifying body fluid of a living animal comprising in combination:
   (a) a housing,
   (b) at least one hepatifying unit comprising
      (1) a first semi-permeable membrane having an exterior and an interior surface and permeable to molecules smaller than animal cells,
      (2) a second semi-permeable membrane having an exterior and an interior surface and permeable to molecules smaller than proteins,
      (3) said membranes being of contact with each other over at least a major portion of their surfaces and being so disposed as to enclose a space for reception of living animal liver cells,
      (4) a layer of living animal liver cells in said space and in contact with each said interior surface of said membranes,
   (c) means for flowing said body fluid in a confined path over said exterior surface of said first membrane,
   (d) means for flowing dialysate liquid in a confined path over said exterior surface of said second membrane, and
   (e) means for separately withdrawing said body fluid and said liquid.

15. An assembly as in claim 14 comprising a plurality of said hepatifying units.

16. Method of purifying blood or a body fluid of a living animal which comprises:
   (a) flowing said blood or fluid over living liver cells partitioned off and out of direct contact with said blood or fluid by a semi-permeable membrane, and
   (b) dialyzing said blood or fluid by flowing over a second membrane,
   (c) said second membrane partitioning off a flowing dialysate liquid and maintaining said fluid and said liquid out of contact with each other.

17. A semipermeable membrane and means associated therewith for positioning body fluid to be treated in contact with one side of said membrane; and
   once dispersed live liver cells located proximate the opposite side of said membrane and out of direct contact with said body fluid.

18. The method of treating body fluid comprising:
   the positioning of said fluid to be treated into contact with one side of a semipermeable membrane; and
   the positioning of once dispersed live liver cells proximate the opposite side of said membrane.

References Cited

UNITED STATES PATENTS

| | | | |
|---|---|---|---|
| 3,172,546 | 3/1965 | Schreiner | 195—1.8 X |
| 3,279,996 | 10/1966 | Long, Jr. et al. | 195—1.8 X |
| 3,489,647 | 1/1970 | Kolobow | 195—1.8 |
| 3,522,346 | 7/1970 | Chang | 210—22 X |
| 3,608,729 | 9/1971 | Haselden | 210—321 |

OTHER REFERENCES

Rubin et al.: "Collagen Materials in Dialysis and Implantation," from Trans. Amer. Soc. Artif. Int. Organs, vol. XIV, June 14, 1968, pages 169–175 relied on, copy in p. 175.

Nose et al.: "An Experimental Artificial Liver Utilizing Extracorpureal Metabolism with Sliced or Granulated Canine Liver," from vol. IX J. Trans. Amer. Soc. Artif. Int. Organs, 1963, copy IH GP. 176, pp. 358–362 relied on.

FRANK A. SPEAR, JR., Primary Examiner

U.S. Cl. X.R.

210—321

UNITED STATES PATENT OFFICE
CERTIFICATE OF CORRECTION

Patent No. 3,734,851    Dated May 22, 1973

Inventor(s) Kenneth N. Matsumura

It is certified that error appears in the above-identified patent and that said Letters Patent are hereby corrected as shown below:

Column 3, line 56, "2.05" should read -- 2.50 --. Column 5, line 72, "conduit" should read -- conduct --.

Signed and sealed this 26th day of February 1974.

(SEAL)
Attest:

EDWARD M. FLETCHER, JR.         C. MARSHALL DANN
Attesting Officer               Commissioner of Patents

UNITED STATES PATENT OFFICE
CERTIFICATE OF CORRECTION

Patent No. 3,734,851    Dated May 22, 1973

Inventor(s) Kenneth N. Matsumura

It is certified that error appears in the above-identified patent and that said Letters Patent are hereby corrected as shown below:

Column 2, line 71, cancel "siliconizing". Column 3, line 56, "2.05" should read -- 2.50 --; line 63, after "cells" delete "."; and insert after "cells" -- , i. e., once dispersed cells. --. Column 5, line 72, "conduit" to -- conduct --. Column 6, line 23, "Signamotor" to -- Sigmamotor --; starting at line 35, after "37°" insert -- C --, and delete "and bubbled through it a stream of gas comprising 90% oxygen and 10% $CO_2$"; line 40, after "closed passage" insert -- , --; line 44, after "conduts 44." insert -- The dialysate liquid may be oxygenated with an appropriate mixture of oxygen and carbon dioxide. --; line 45, change "6, 7 and 8" to -- 5, 6 and 7 --; line 50, change "51" to -- 49 --; line 73, delete "shell 59" and substitute therefor -- housing 46 --. Column 7, line 4, change "55" to -- 54 --; Table I, change "3.50 mg." to -- 3.50 gm. --; Table II, change "3.55 mg." to -- 3.55 gm. --; line 72, change "wtich" to

UNITED STATES PATENT OFFICE
CERTIFICATE OF CORRECTION

Patent No. 3,734,851      Dated May 22, 1973

Inventor(s) Kenneth N. Matsumura      Page - 2

It is certified that error appears in the above-identified patent and that said Letters Patent are hereby corrected as shown below:

-- which --. Column 8, line 18, change "fluid" to -- cells --.
Column 9, line 15, after "being" insert -- out --.

Signed and sealed this 5th day of November 1974.

(SEAL)
Attest:

McCOY M. GIBSON JR.
Attesting Officer

C. MARSHALL DANN
Commissioner of Patents